Sept. 7, 1926.

B. McCABE

ANIMAL TRAP

Filed Dec. 2, 1925

WITNESSES
M. Fowler

INVENTOR
Ben McCabe
BY
ATTORNEYS

Patented Sept. 7, 1926.

1,598,780

UNITED STATES PATENT OFFICE.

BENEDICT McCABE, OF ORLEANS TOWNSHIP, WINNESHIEK COUNTY, IOWA.

ANIMAL TRAP.

Application filed December 2, 1925. Serial No. 72,784.

My invention relates generally to improvements in animal traps, and it relates more particularly to an attachment for an animal trap of a type which comprises a downwardly swingable trigger member on which a bait supporting plate or holder is supported, the trigger being adapted when moved downwardly from a given position to release the means for preventing a pair of spring pressed swingable jaw members from closing so that said jaw members then will be permitted to swing to closed position.

An object of the invention is the provision of an attachment for a trap of the character described, which will afford facilities for preventing the accumulation of matter under the swingable trigger or bait supporting member without interfering with the downward movement of the trigger that is necessary to release the jaw holding means.

A further object of the invention is the provision of an attachment of the character described which can be removably attached to a trap of the character described without any change in the construction of the trap being required.

Other objects and advantages of the invention will be apparent from the following description, considered in conjunction with the accompanying drawings, in which—

Figure 1:
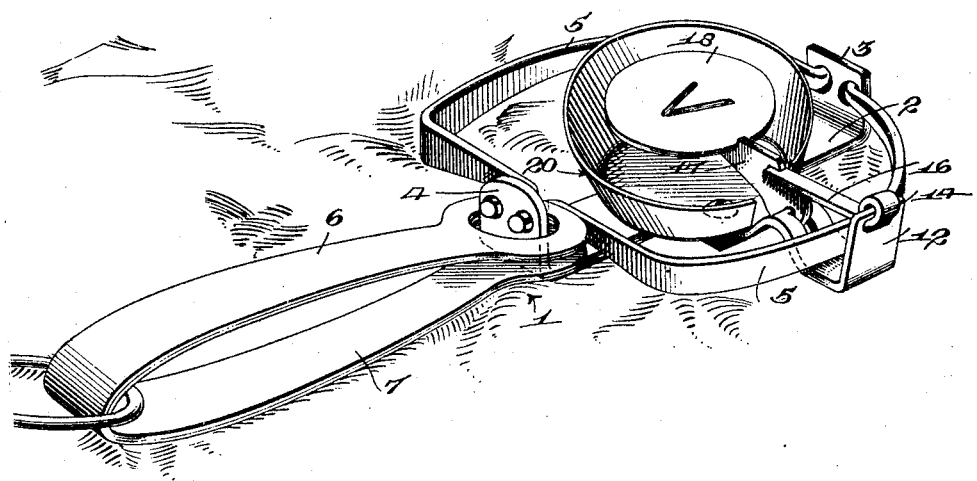
Figure 1 is a perspective view of a trap equipped with an attachment embodying the invention.
Figure 2:
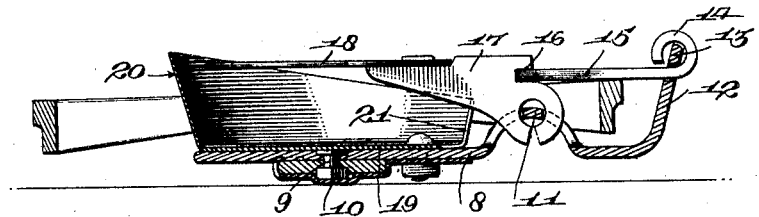
Figure 2 is a transverse vertical section through the structure exhibited in Figure 1.
Figure 3:
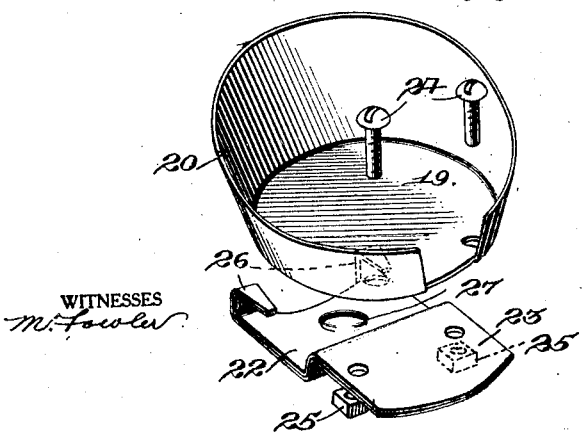
Figure 3 is a perspective view of the elements of the attachment separated from one another.

In carrying out the invention, I make use of a trap generally indicated at 1 which may be conventional construction and which may be described as comprising a base bar or supporting member 2 having upturned end portions 3 and 4 respectively. Substantially U-shaped jaw members 5 have outturned end portions constituting journals which are received in openings in the upturned end portions 3 and 4 of the base bar or supporting member 2. The handle of the trap is a spring bar bent transversely intermediate its length to produce a pair of spring arms 6 and 7, the free ends of which have vertical openings through which the end portion 4 of the base bar extends. The extremities of the spring arms 6 and 7 are disposed on the end portion 4 of the base bar underneath the adjacent end portions of the jaws 5 and the upper of these spring arms, as 6, acts continuously on the jaws 5 when the jaws are open, as shown in Figures 1 and 2 and tends to swing the jaws upward toward closed position. An end portion of a laterally extending arm 8 extends across the base bar 2 and is attached to the latter by a bolt 9 and a nut 10. This lateral arm 8 is arched intermediate its length and this arched portion is provided with transverse apertures, thus defining a transverse pivot element 11 for a purpose to be presently described. The outer end portion of the lateral arm 8 curves upwardly at 12 and is formed to provide a transverse pivot element 13 for engaging with an eye 14 at the outer end of a swingable holding member 15. The holding member 15 is adapted to swing vertically to and from position to extend across the adjacent jaw member and to engage with a notch 16 in the outer end of a trigger 17 which is pivotally supported at its outer end on the horizontal pivot element 11. When the holding member 15 is in the positions shown in Figures 1 and 2 and is in engagement with the notch 16, the said one jaw 5 will be held against swinging upward from position shown in Figures 1 and 2, the extremity of the upper arm 6 of the spring handle will be prevented from swinging upward in response to the inherent resiliency of the spring handle, the second jaw member 5 will remain in its downwardly swung position by gravity and the trigger 17 will be retained in substantially horizontal position with its free inner end above the base bar 2.

The inner end portion of the trigger 17 carries a plate or "pan" 18 for supporting a suitable bait between the jaw members. When an animal steps on the plate 18, the inner end of the trigger 17 is depressed, thereby releasing the swingable holding member 15 and permitting the spring pressed jaws to close.

In actual practice, small sticks, stones, ice and like foreign matter lodge underneath the inner end portion of the trigger 17 and the bait holding plate 18 and may prevents such downward swinging movement of the inner end of the trigger as is necessary to effect release of the holding member and the spring pressed jaws. To prevent the accumulation of such foreign matter under the trigger and the bait holding plate, the present invention provides a guard comprising a plate 19 which is adapted to be superimposed on the arm 8 of the trap underneath the bait holding plate 18 and the inner or free end portion of the trigger 17. This plate 19 preferably conforms substantially in configuration to the bait holding plate 18 and is formed with an outwardly and upwardly inclined marginal flange 20. The upper edge of this marginal flange 20 lies in a plane which is inclined in respect to the horizontal and which slopes from a point slightly above the level of the bait holding plate when the free end of the trigger is in raised position as shown in Figures 1 and 2 to a level slightly below that of the bait holding plate. The highest part of the flange 20 is located directly opposite the free end of the trigger 17 while the lowest part of the marginal flange 20 of the guard is nearest to the axis of swinging movement of the trigger 17. The marginal flange 20 of the guard is provided with a vertical notch or slot 21 to permit swinging movement of the trigger 17 from the position shown in Figures 1 and 2 downwardly until the bait holding plate 18 rests on the bottom plate 19 of the guard. The inner end portion of the trigger 17 and the bait holding plate 18 thus are partially received in the flange 20 of the guard.

The guard is held removably in place on the base bar 2 of the trap by a clip which comprises a flat bar-like member having a portion 22 extending transversely across the underside of the base bar 2. This portion 22 of the clip is integral at one end with an upwardly offset attaching portion 23 which is firmly secured to the bottom plate of the guard by means of fastening devices, such as the bolts 24 and the nuts 25, the bolts extending through vertically aligned openings in the bottom plate 19 of the guard and the attaching portion 23 of the clip, respectively. The portion 22 of the clip has integral spaced extensions at its opposite end bent upwardly and then inwardly to produce hook members 26 which engage with the edge portion of the base bar 2 at the side of the latter opposite the attaching portion 23 of the clip, whereby the guard will be clamped against the upper face of the lateral arm 8 and securely held in place when the bottom plate 19 of the guard is secured to the attaching portion 23 of the clip in the manner just described.

From the foregoing description of the various parts of the device, the operation thereof will be readily understood. The guard will not interfere with the desirable swinging movement of the bait holding plate and the inner end portion of the trigger 17. However, the marginal flange 20 of the guard will prevent lateral movement of foreign matter to position underneath the bait holding plate and the inner end portion of the trigger, thus assuring downward movement of the bait holding plate and the inner end portion of the trigger when an animal steps on the bait holding plate and thus permitting the jaws of the trap to close fully and quickly as required to catch the animal. The portion 22 of the body of the clip may be depressed as indicated at 27 to receive the nut 10 on the bolt 9 that secures the lateral arm 8 to the base bar 2, thus also tending to prevent accidental loosening of the nut 10 and detachment of the lateral arm 8 from the base member of the catch.

Obviously, my invention is susceptible of embodiment in forms other than that illustrated in the accompanying drawing and I therefore consider as my own all such modifications and adaptations of the form of the device herein described as fairly fall within the scope of the appended claims.

I claim:—

1. The combination with a trap having a flat base member, an arm extending laterally from the base member, and a trigger supported on said lateral arm so that the free end portion of the trigger may swing vertically above said base member of a guard comprising a flat bottom member superimposed on said base member underneath the free end portion of said trigger, said bottom member having an upwardly extending marginal flange partially encompassing the free end of said trigger, and a clip having an attaching portion at one side of the base member attached to the bottom plate of the guard and having a hook means engaging with the edge portion of the base member at the opposite side of the latter for holding said bottom plate clamped in place on the upper face of said base member.

2. The combination with a trap comprising a flat base member, an arm having the inner end portion thereof secured against the underside of said base member by a bolt and nut, the nut being at the lower end of the bolt and underneath said lateral arm, and a trigger pivotally attached at its outer end to said lateral arm so that the inner end portion of the trigger can swing vertically above said base member, of a guard comprising a bottom plate superimposed on said lateral arm underneath the free end portion of said trigger, said bottom plate having an upwardly extending maginal flange partially encompassing the free end portion of said trigger, and a clip comprising a portion extending underneath said base member and having an attaching portion at one side of the base member secured to said laterally extending arm and hook members at the opposite side of the base member in engagement with the adjacent edge portion of said base member, said first named portion of the clip having a depressed portion receiving the nut of the connection between the lateral arm of the base member and thus preventing accidental displacement of the nut.

BENEDICT McCABE.